(12) United States Patent
Kim

(10) Patent No.: US 7,284,875 B2
(45) Date of Patent: *Oct. 23, 2007

(54) FLASHLIGHT ATTACHMENT ARRANGEMENT

(75) Inventor: Paul Y. Kim, Santa Ana, CA (US)

(73) Assignee: Surefire, LLC, Fountain Valley, CA (US)

( * ) Notice: Subject to any disclaimer, the term of this patent is extended or adjusted under 35 U.S.C. 154(b) by 117 days.

This patent is subject to a terminal disclaimer.

(21) Appl. No.: 11/064,885

(22) Filed: Feb. 23, 2005

(65) Prior Publication Data

US 2006/0164846 A1    Jul. 27, 2006

Related U.S. Application Data

(60) Provisional application No. 60/648,352, filed on Jan. 26, 2005.

(51) Int. Cl.
*B25B 23/18* (2006.01)
(52) U.S. Cl. ...................... 362/120; 362/191
(58) Field of Classification Search ........ 362/119–120, 362/190–191, 202, 474
See application file for complete search history.

(56) References Cited

U.S. PATENT DOCUMENTS

| 1,144,210 | A |  | 6/1915 | Kincaid |
| 1,361,021 | A |  | 12/1920 | Copeman |
| 1,439,404 | A |  | 12/1922 | Cotharin |
| 1,868,778 | A |  | 7/1932 | Tomney |
| 2,242,536 | A |  | 5/1941 | Montgomery |
| 2,674,685 | A |  | 4/1954 | Young |
| 3,510,643 | A |  | 5/1970 | File |
| 4,669,186 | A |  | 6/1987 | Liu |
| 5,072,342 | A | * | 12/1991 | Minovitch .................. 362/111 |
| 5,642,932 | A |  | 7/1997 | Matthews |
| 5,857,268 | A |  | 1/1999 | Park |
| D412,096 | S |  | 7/1999 | Kung et al. |
| D412,355 | S |  | 7/1999 | Saetherbo |
| 6,135,608 | A |  | 10/2000 | Lin |
| 6,336,731 | B1 |  | 1/2002 | Chien |
| 6,419,371 | B1 |  | 7/2002 | McCalla et al. |
| 6,511,199 | B1 |  | 1/2003 | Chung |
| 6,841,941 | B2 |  | 1/2005 | Kim et al. |
| 2003/0112622 | A1 |  | 6/2003 | Chu et al. |
| 2004/0174700 | A1 |  | 9/2004 | Zirk et al. |

* cited by examiner

*Primary Examiner*—Sandra O'Shea
*Assistant Examiner*—Jason Moon Han

(57) ABSTRACT

Apparatus for securing a flashlight and an object to one another, the flashlight including a body with a lamp housing along a longitudinal axis, the lamp housing including longitudinal slots and the body including a groove perpendicular to the axis and intersecting the slots. The object, which may be a knife blade or a bracket, includes slot-engaging parts (preferably longitudinally extending tangs) for being slidably received by the slots. A retainer is disposed in the flashlight body groove and is adapted for cooperation with the tangs for releasably retaining the tangs in the slots.

18 Claims, 4 Drawing Sheets

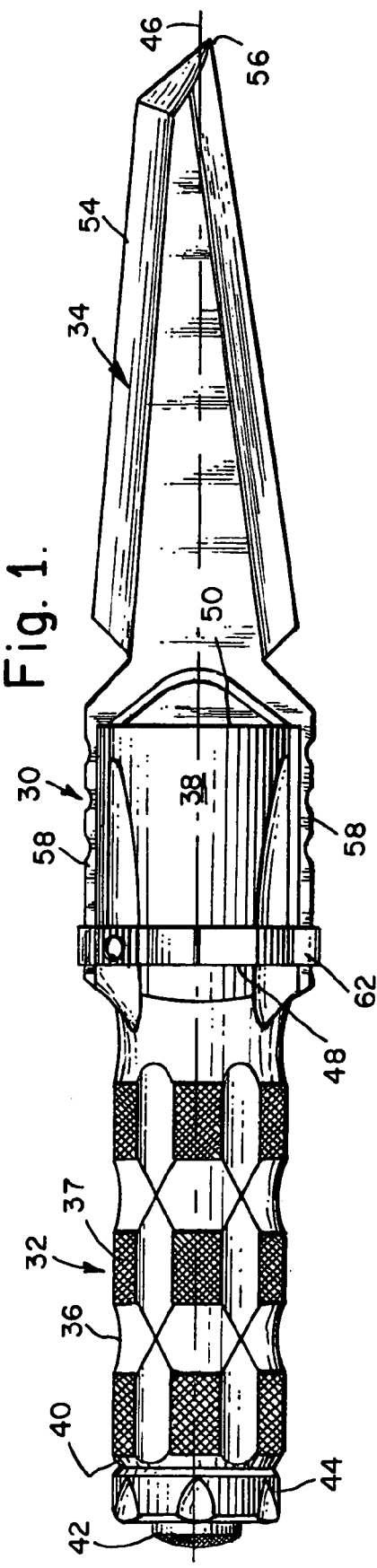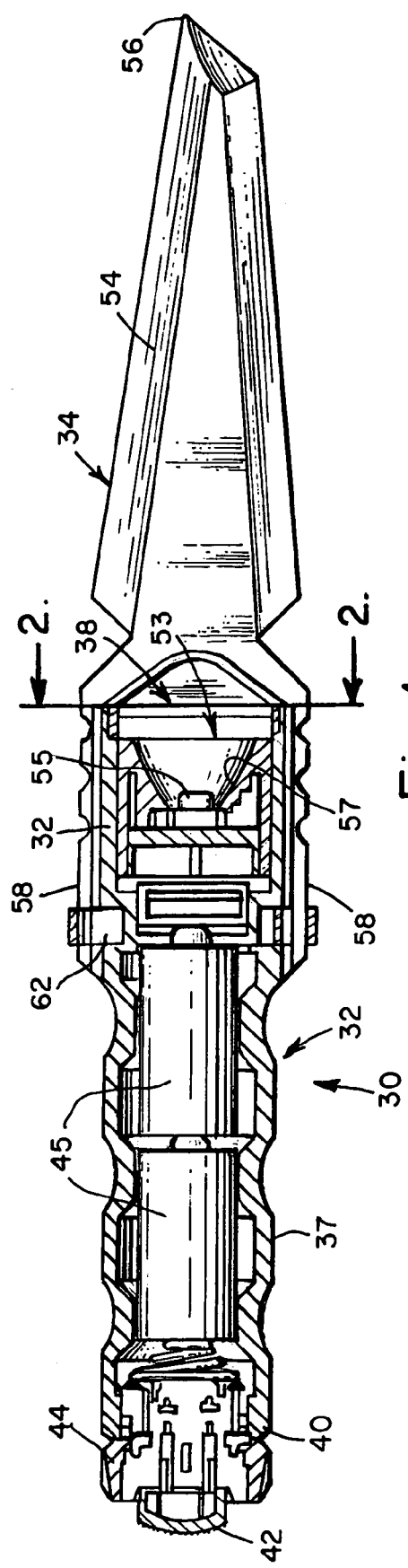

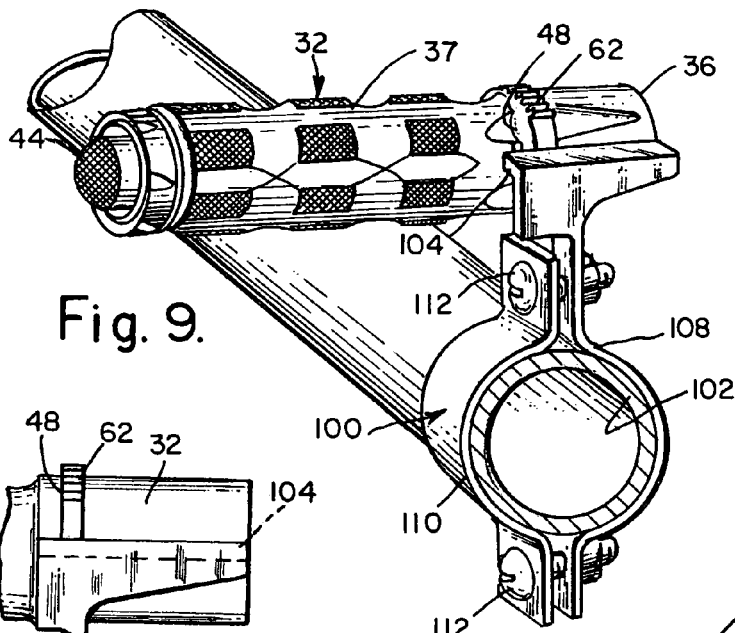
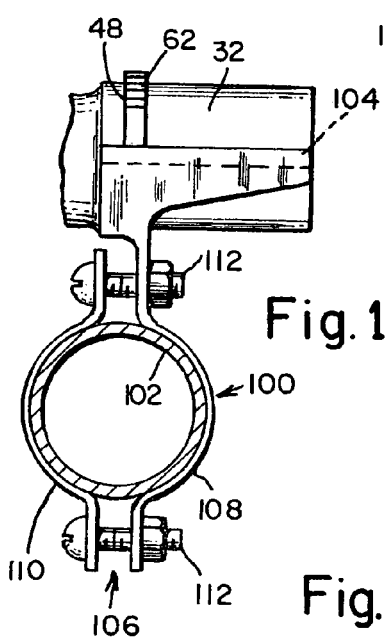
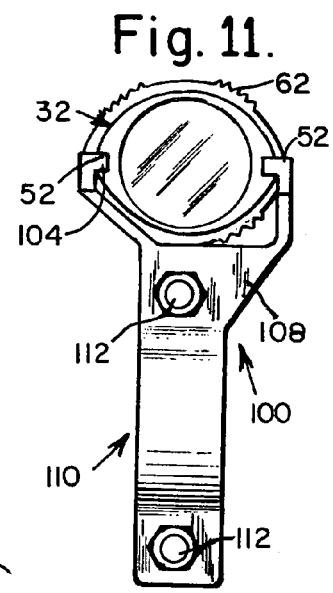
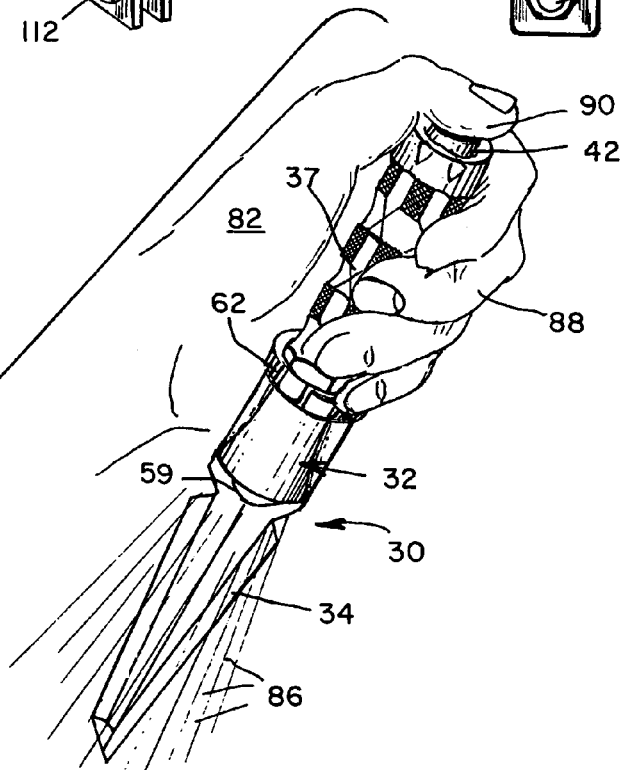

FLASHLIGHT ATTACHMENT ARRANGEMENT

CROSS REFERENCE TO RELATED APPLICATION

This application claims the benefit of U.S. Provisional Application No. 60/648,352, filed Jan. 26, 2005, which application is incorporated herein by reference.

BACKGROUND OF THE INVENTION

The present invention relates to a system and a method for a flashlight attachment arrangement and, in particular, to such an arrangement for effecting an attachment between the flashlight and an object, such as a knife or, alternatively, a support, e.g., a mechanism capable of coupling the flashlight to a bicycle handlebar. In addition, when the object comprises a knife, the present invention envisions the flashlight-knife combination as employable in hand-to-hand combat.

There are many arrangements for combining some object or objects, such as tools, culinary utensils and knives, with a support or handle and sometimes with a flashlight. Examples of patents disclosing such arrangements are described in the following United States utility and design patents: U.S. Pat. Nos. 1,144,210; 1,361,021; 1,439,404; 1,868,778; 2,242,536; 2,674,685; 3,510,643; 4,669,186; 5,857,268; 6,135,608; 6,336,731 and 6,511,199; and Des. Nos. 412,096 and 412,355. For those of the described arrangements in the above patent disclosures, which incorporate a flashlight, the flashlight is used solely for its lighting purpose, such as simply to illuminate a work or other space, or as an accessory; there is no further use. For those arrangements showing tool or knife attachments, the securing ability of the attachment mechanism is appears limited.

SUMMARY OF THE INVENTION

These and other problems are successfully addressed and overcome by the present invention. For example, when the use is for hand-to-hand combat, as in the present invention, none of the above-mentioned prior art is employable therefor.

Accordingly, an improved arrangement is provided for enabling a cooperative interengagement between a flashlight and an object, such as a knife, or a bracket attached to a support, e.g., a bicycle handlebar. The preferred cooperative arrangement includes tangs on the object which tangs are adapted to engage and be retained in slots in the flashlight.

The favored object-holding retention mechanism includes a groove in the flashlight into which a retainer is held. The groove is positioned to intersect the slots and, therefore, to receive the tangs. The retainer has a biased latching cooperative interengagement with the tangs, one which forms a normal engagement, but is removable from this cooperative interengagement. The specific retainer includes spring-like cantilevered arms, one for each tang, which are biased into respective engagements with the tangs. More specifically, the retainer comprises a pair of retainer halves having respective bases which are coupled together to form a unitary band and which support the respective spring-like cantilevered arms.

When the object comprises a knife, both the knife blade and the emitted light extend parallel to the axis of the flashlight. Such a flashlight-knife arrangement may be used for engaging in hand-to-hand combat between a user and an opponent. Because the knife is secured to the flashlight light-emitting end and both the knife blade and its cutting tip extend outwardly from the flashlight light-emitting end, the light from the flashlight can propagate along the knife blade. Accordingly, when the flashlight-knife arrangement is raised in a combative manner, the emitting light is directed towards the opponent to produce at least a blinding and brief destabilizing effect on the opponent, gives the user a momentary advantage, and enables the user an opportunity to strike the opponent with the knife. Depending upon the desired training of the user, the emitting light may be turned on either before or after the flashlight is in its striking mode.

For other uses, for example, for the flashlight-bracket arrangement, the tangs are secured to the bracket, which includes a gripping mechanism for securing the bracket to a support, such as a bicycle handlebar.

Several advantages are derived from this arrangement. The present invention is easily adaptable for use as a weapon for hand-to-hand combat, and makes the best use of the illuminating power of the flashlight. Whether used as a weapon or not, the attachment mechanism provides for easy attachment and disengagement and, additionally, and has increased securing capability.

Other aims and advantages, as well as a more complete understanding of the present invention, will appear from the following explanation of exemplary embodiments and the accompanying drawings thereof.

BRIEF DESCRIPTION OF THE DRAWINGS

FIGS. 1 and 1a respectively are elevational and cross-sectional side views of a preferred embodiment of the present invention exemplified as a knife blade attached to a flashlight;

FIG. 8 is an illustration of how the flashlight-knife embodiment of FIGS. 1-7 may be employed in hand-to-hand combat;

FIG. 9 is perspective view of another embodiment of the present exemplified as an attachment for attaching a flashlight to a support, such as a handlebar of a bicycle;

FIG. 10 is a side view of the embodiment of FIG. 9; and

FIG. 11 is a front view of the arrangement depicted in FIG. 10.

DETAILED DESCRIPTION OF THE PREFERRED EMBODIMENTS

Figure 3:
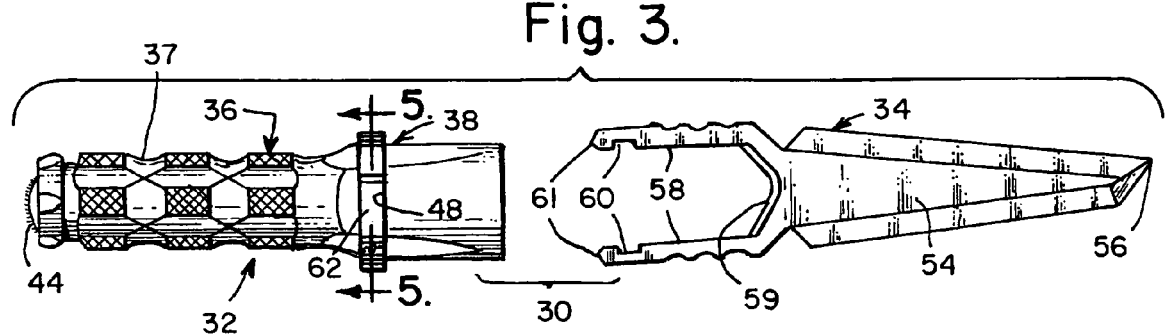
FIG. 3 is a side view of the embodiment illustrated in FIG. 1 but with the knife blade removed and slightly spaced from and in alignment with the flashlight.
Figure 4:
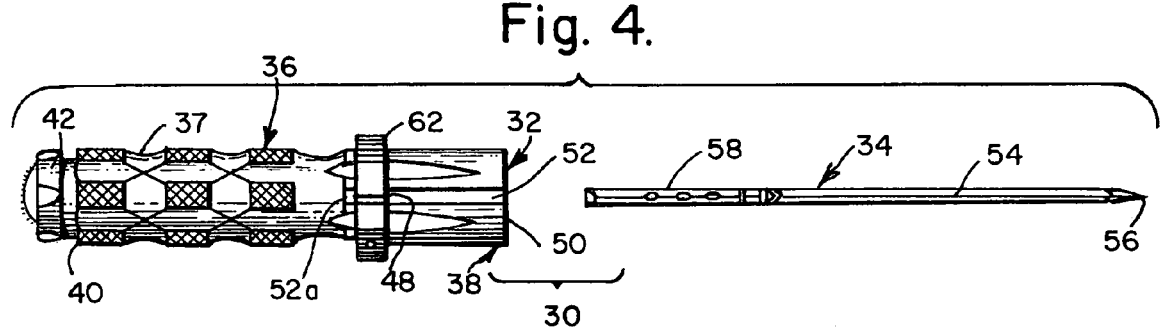
FIG. 4 is a side view of the embodiment illustrated in FIG. 1 similar to that shown in FIG. 3 but angled orthogonally thereto.

A flashlight attachment arrangement 30 is illustrated in the first embodiment of the present invention, as shown in FIGS. 1-7b, as a knife combination of a flashlight 32 and a knife blade 34. Flashlight 32 may take any configuration as is known in the art as being capable for use in the present invention. Thus, the present invention may be employed with such lamp assemblies and rear cap pushbutton switch assemblies of the types shown, for example, in U.S. Pat. No. 5,642,932 to John W. Matthews, and in U.S. Pat. No. 6,841,941 to Paul Y. Kim and William A. Hunt, which patents are incorporated herein by reference. Nonetheless, it is understood that other flashlights may be used in combination with the apparatus disclosed herein and, accordingly, the illustrated flashlight represents an example of a type of flashlight for use in the present invention.

Referring back to FIGS. 1-7b, flashlight 32 includes a body 36 having a mid-section 37 bounded by a front end 38 and a tail end 40. Tail end 40 incorporates a switch 42 and a rear cap 44. The switch may comprise a simple on-off mechanism that causes its lamp 55 (which may be, for example, an incandescent bulb or a light emitting diode, preferably a high intensity LED) to light only when pressed, and/or a double activation mechanism, one for illuminating the lamp 55 and the other for turning the lamp off. The flashlight body 36 is adapted to house (in its midsection or battery housing 37) a battery comprising at least one battery cell 45 therein and is disposed along a longitudinally-extending axis 46 (see FIG. 1).

Figure 2:
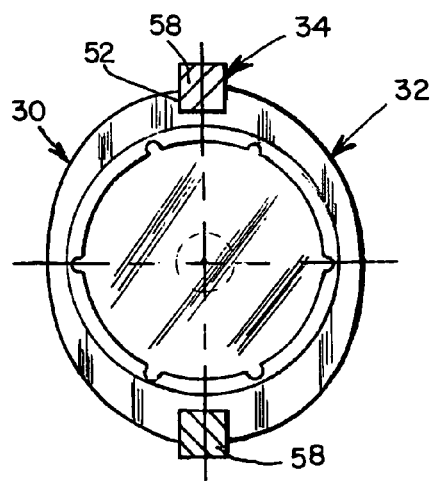
FIG. 2 is a cross-sectional view of the embodiment depicted in FIG. 1a taken along line 2-2 thereof.
Figure 6:
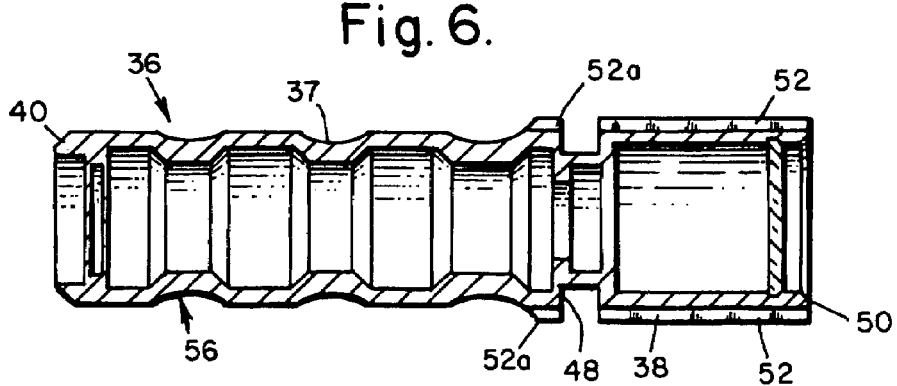
FIG. 6 is a cross-sectional side view of the flashlight body of the flashlight depicted in FIGS. 1-4.

Front end 38 is coupled at its inner end to midsection 37 at a grooved intersection 48 therewith, as will be more fully described shortly, and terminates at a light-emanating terminus 50. A pair of slots 52 are formed in front end 38, as best seen in FIGS. 2 and 6, which slots are located parallel to axis 46 and extend from light-emanating terminus 50 to somewhat beyond grooved intersection 48, into a slot extension 52a which extends slightly into body mid-section 37. Alternatively stated, intersection 48 divides the slots into a main slot 52 and a smaller or minor slot 52a.

A lamp assembly 53 (see FIG. 1a), including the lamp 55 and a reflecting device 57, is housed in front end 38 and is electrically coupled to the battery 45 for providing a source of light which is directed to emanate from the front end terminus along axis 46, e.g., as a beam 86 as illustrated in FIG. 8.

Knife blade 34 includes a cutting portion 54, which terminates in a point or tip 56. A pair of tangs or slot-engaging parts 58 extend rearwardly from the cutting portion, that is, in the opposite direction from tip 56. Tangs 58 are disposed to fit snugly within slots 52. The knife blade is beveled as denoted by indicium 59 (see FIG. 3) to diminish the reflection of light from the flashlight. Inwardly-directed notches 60 are formed adjacent the ends of the tangs. Further, as shown in FIG. 3, the tang ends are beveled, as denoted by indicia 61, for enabling the knife blade to be latched into a secure engagement with the flashlight, as will be shortly described.

Figure 5:
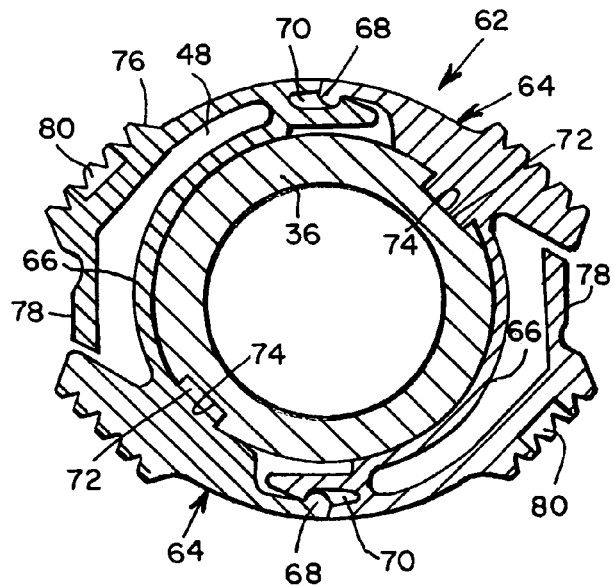
FIG. 5 is a cross-sectional view of the flashlight shown in FIG. 3 taken along line 5-5 thereof depicting a two-piece retainer mounted on a flashlight for retaining a knife blade on the flashlight or the flashlight on a support.
Figure 7:
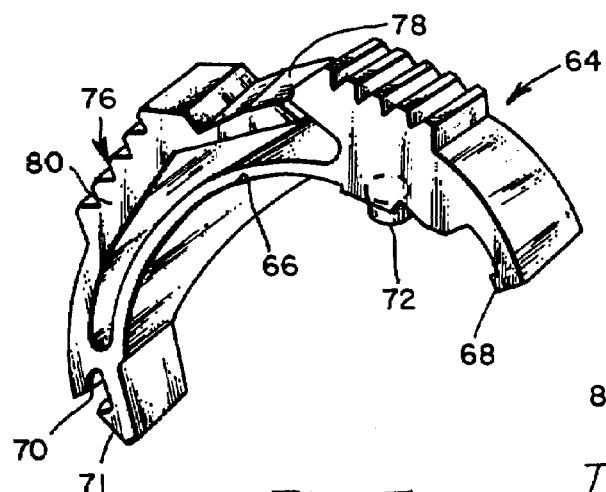
FIG. 7 is a perspective view of one piece or clip of the retainer for latching the knife blade to the flashlight.
Figure 7B:
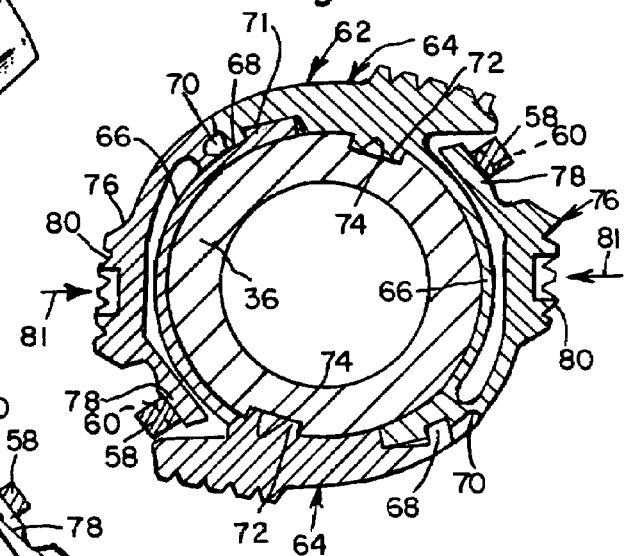
FIG. 7b is a cross-sectional view, similar to that of FIG. 7a, but showing how the knife blade is disengaged from the two-piece flashlight retainer.
Figure 7A:
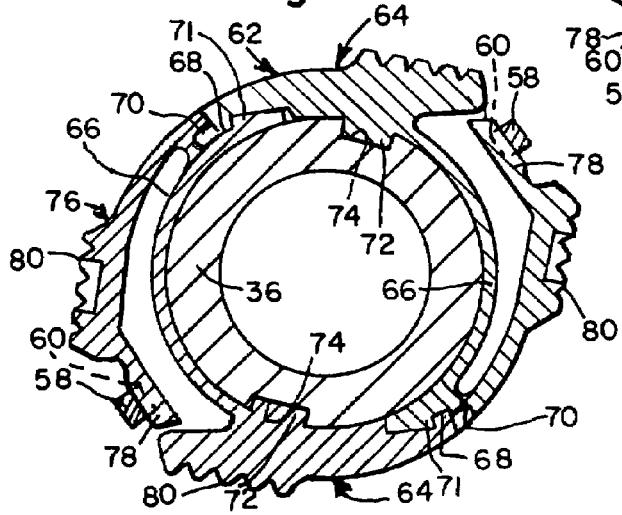
FIG. 7a is a cross-sectional view, similar to that of FIG. 5, but showing the engagement of the knife blade with the two-piece flashlight retainer.

Referring to FIGS. 5, 7a and 7b, a retainer or retainer clip 62 is fitted into grooved intersection 48 and engages notches 60 of the knife tangs to affix the knife blade to the flashlight. The retainer comprises a pair of identically configured clip halves 64, of which one is illustrated in FIG. 7. As indicated in FIGS. 1 and 3-6, the groove of the grooved intersection 48 is formed on the exterior surface of the body 36 and is orthogonal to the longitudinal axis 46.

Each retainer half includes a base 66 which, when the two bases are coupled together, forms a unitary band which is secured within the groove of grooved intersection 48 and, thereby, to body 36. The coupling of the bases of the respective retainer halves is effected by a mutually engaging fastening mechanism comprising a projection 68 and a latching recess 70 having a complementary catch 71. Thus, when retainer halves 64 are fitted within the grooves of intersection 48 and the respective projections and latching recesses are engaged, as shown in FIGS. 5, 7a and 7b, the halves are formed into unitary-banded retainer 62 which is thus captured onto flashlight body 36. The groove and the unitary band are preferably circularly configured, and to ensure that the retainer does not rotate with respect the flashlight body and to orient the retainer with respect to slots 52 in front end 38 of the flashlight, protuberances 72 are formed respectively on the interior surfaces of retainer 62 and equivalent mating holes 74 are formed on the exterior surface of body 36 within grooved intersection 48.

Each retainer half 64 further includes a spring-like cantilevered arm 76 which is secured at one end (a first end) to its base 66 and terminates in a distal (second) end 78. The distal ends of the retainer halves are positioned respectively at slots 52 and retained in that orientation resulting from the engagement between protuberances 72 and holes 74.

The latching engagement between knife blade 34 and flashlight 32 may be understood when taken with the depictions shown in FIGS. 3, 4, 6 and 7a. Here, the knife blade is so positioned with respect to the flashlight that its tangs 58 are aligned with flashlight slots 52. Sliding of the tangs along the slots brings beveled ends 61 into contact with distal ends 78 of each retainer half 64. Because of the springiness of the cantilevered arm, beveled ends cam against their respective distal ends and depress the distal ends inwardly of the flashlight, until inwardly-directed notches 60 in the tangs are aligned with distal ends 78, at which point the distal ends snap into notches 60 and latch the knife blade into a secure connection with the flashlight.

Disengagement of the knife blade from the flashlight is shown in FIG. 7b. Here, for each retainer half, a finger or thumb-engaging pad 80 is positioned on the exterior surface adjacent the distal end for enabling a user to inwardly depress spring-like cantilevered arm 78 as exhibited by arrows 81 (see FIGS. 7a and 7b), and thereby to move the distal end inwardly, towards axis 46, and from its biased engagement with notches 60 in the knife blade tangs of knife blade 34. The knife blade can then be slid forwardly on the flashlight along slots 52 and separated therefrom.

FIG. 8 illustrates the employment of flashlight attachment arrangement 30 as a weapon useful for hand-to-hand combat. This embodiment has knife blade 34 secured to flashlight 32, in which hand-to-hand combat is between a user and an opponent, respectively shown as a user's hand 82 and an opponent 84. Because of the orientation of the knife blade with respect to the light-emitting end of the flashlight, that is, the knife blade and its cutting tip extends outwardly from the light-emitting end, the light propagates along the knife blade, as depicted by beam 86. Thus, the user will direct the emitting light beam 86 towards opponent 84 to effect a blinding and at least momentary destabilizing result on the opponent and will enable the user to simultaneously strike the opponent with the knife. This operation can most effectively be conducted by gripping the flashlight with fingers 88 in the palm of the user's hand (the flashlight body 36, and in particular the middle portion 37, being utilized as a knife handle) and then depressing tail-end switch 42 with the user's thumb 90 to suddenly cause light to be emitted, while the user rapidly moves the flashlight-knife combination towards the opponent. However, depending upon the most effective method, the tail-end switch may be depressed prior to or after the flashlight is raised to strike the opponent.

Referring now to FIGS. 9-11, rather than, or alternatively to, a knife blade 34, the object to which flashlight 32 is attached is a bracket 100 for enabling the flashlight to be secured to a support, such as a handlebar 102 of a bicycle. Bracket 100 includes tangs 104 which are adapted to be slidingly received by slots 52 and be latched to the flashlight in the same manner as described with respect to knife blade tangs 58. The bracket includes a suitable gripping mechanism 106 for securing the bracket to the bicycle handlebar. Such a gripping mechanism includes a first U-shaped portion 108 integral with tangs 104 and a second U-shaped portion 110 which is attachable to the first U-shaped portion by bolts 112.

In the embodiments disclosed, it is possible to utilize the flashlight solely for its illuminating purposes and, therefore, the present invention allows for such use without the addition of any object, such as the knife or bracket, or by removing the flashlight from the object. Further, should it be desired, the knife blade of one configuration may be easily and securely replaced by another blade configuration or some other object.

Although the invention has been described with respect to particular embodiments thereof, it should be realized that various changes and modifications may be made therein without departing from the spirit and scope of the invention.

What is claimed is:

1. An arrangement for enabling a cooperative interengagement between a flashlight and an object comprising:
   an object including tangs;
   a flashlight including a body with a battery therein, said body having a longitudinally-extending axis and a front end with a light emanating terminus;
   slots in said front end positioned about said axis and extending parallel to said axis, said slots adapted to slidably receive said tangs;
   a lamp assembly housed in said front end and electrically coupled to said battery for providing a source of light disposed to emanate from said terminus;
   a groove in said body orthogonal to said axis, said slots extending into said groove; and
   a retainer disposed in said groove and engageable with said tangs to effect the cooperative interengagement, said retainer and said tangs including a mutually cooperative latching mechanism for securing said object to said body comprising
      a latching element on at least one of said tangs, and
      a spring-like cantilevered arm on said retainer securable to said body and biased into engagement with said latching element, and being adapted to move from the biased engagement.

2. An arrangement according to claim 1 wherein:
   said slots are two in number and are positioned diagonally opposite from one another; and
   said tangs are two in number.

3. An arrangement according to claim 1 wherein said retainer includes a latch-releasing device for releasing said tangs from said retainer.

4. An arrangement according to claim 3 wherein said object comprises a knife blade.

5. An arrangement according to claim 4 wherein said lamp assembly and said knife blade are positioned along said axis for enabling the emanating light to be bifurcated essentially by said knife blade.

6. An arrangement according to claim 3 wherein said object comprises a bracket adapted to be secured to a support.

7. An arrangement according to claim 6 wherein said bracket includes a gripping mechanism for securing said bracket to a bicycle handlebar.

8. Apparatus according to claim 1, wherein:
   said object includes a bracket.

9. Apparatus according to claim 8, wherein:
   said tangs extend from said bracket.

10. An arrangement according to claim 1, wherein:
    said light provided by said lamp assembly is disposed to emanate from said terminus along said axis.

11. An arrangement according to claim 10, wherein:
    said object comprises a knife blade situated along said axis when said tangs are retained in said slots.

12. An arrangement for enabling a cooperative interengagement between a flashlight and an object comprising:
    an object including two tangs;
    a flashlight including a body with a battery therein, said body having a longitudinally-extending axis and a front end with a light emanating terminus;
    two slots in said front end positioned diagonally opposite one another about said axis and extending parallel to said axis, said slots adapted to slidably receive said tangs;
    a lamp assembly housed in said front end and electrically coupled to said battery for providing a source of light disposed to emanate from said terminus;
    a groove in said body orthogonal to said axis, said slots extending into said groove; and
    a retainer disposed in said groove and engageable with said tangs to effect the cooperative interengagement, said retainer and said tangs including a mutually cooperative latching mechanism for securing said object to said body comprising
       latching elements respectively on said tangs, and
       a pair of spring-like cantilevered arms respectively on said retainer and securable to said body, said pair of spring-like cantilevered arms being biased into respective engagements with said latching elements and adapted to be moved from and set free the biased engagements.

13. An arrangement according to claim 12 wherein each of said spring-like cantilevered arms includes:
    an end moveable towards the axis against the spring bias, said end being engageable with said tang latching element; and
    a finger-engaging pad adjacent said end for enabling a user to move said end towards said axis against the spring bias.

14. An arrangement according to claim 12 wherein said retainer includes a pair of bases couplable together to form a unitary band secured within said groove, said spring-like cantilevered arms being respectively secured to said bases.

15. An arrangement according to claim 14 wherein each of said bases includes a hook-configured end and a recess-configured end for enabling said bases to be latched together to form said unitary band.

16. An arrangement according to claim 15 wherein said groove and said bases are configured to resist relative rotation between said bases and said body and to orient said latching elements of said tangs with respect to said spring-like cantilevered arms of said retainer.

17. An arrangement according to claim 16 wherein said groove and said unitary band are circularly configured, and said groove and said bases have cooperating projections and indentations for resisting rotation between said unitary band and said body.

18. An arrangement according to claim 17 wherein each of said spring-like cantilevered arms includes:

a first end secured to said base;
a second end engageable with said tang latching element and urgeable towards said axis against the spring bias for disengaging said tang latching element; and
a finger-engaging pad adjacent said second end for enabling a user to urge said second end toward said axis.

* * * * *